United States Patent [19]
Osano

[11] 3,724,034
[45] Apr. 3, 1973

[54] DEVICE FOR TYING FISHING LINE
[76] Inventor: Kumao Osano, Kanigaya 313, Kawasaki-shi, Kanagawa-ken, Japan
[22] Filed: Nov. 2, 1970
[21] Appl. No.: 85,988

[30] Foreign Application Priority Data

Nov. 11, 1969   Japan..........................44/106893
Nov. 11, 1969   Japan..........................44/106894

[52] U.S. Cl..................24/131 C, 43/43.1, 43/44.83
[51] Int. Cl. .............................................A01k 91/04
[58] Field of Search......43/43.1, 42.49, 44.83, 44.84, 43/44.92; 24/131 R, 131 C, 129 C

[56] References Cited

UNITED STATES PATENTS

| | | | |
|---|---|---|---|
| D33,775 | 12/1900 | Bower | 43/44.83 X |
| 411,033 | 9/1889 | Huffman | 24/131 R |
| 1,778,119 | 10/1930 | Neville | 24/131 R UX |
| 2,642,640 | 6/1953 | Mills | 24/131 R X |
| 2,905,995 | 9/1959 | Nelson | 24/131 R |
| 2,984,882 | 5/1961 | Winn | 24/131 C |

*Primary Examiner*—Donald A. Griffin
*Attorney*—Cushman, Darby & Cushman

[57] ABSTRACT

This device for tying fishing line to various fishing articles is made of a wire material of a round or oval shape in cross section and comprises a loop for putting one end of the fishing line therethrough, a quill for having an end portion of the fishing line wound therearound, and a V-shaped clip means for securely holding one end of the fishing line therein. The device makes it simple and easy to tie fishing line to various fishing articles and, in use, is capable of preventing the fishing line from being cut at that portion of the line where the tie is made.

5 Claims, 14 Drawing Figures

PATENTED APR 3 1973 3,724,034

INVENTOR.
Kumao Osano
BY
Cushman Darby & Cushman
ATTORNEYS

DEVICE FOR TYING FISHING LINE

BACKGROUND OF THE INVENTION

1. Field of the Invention

The present invention relates to a device for tying fishing line to various fishing articles such as a fishing rod, a fish hook and a sinker.

2. Description of the Prior Art

Today, it is quite common to use a nylon thread for a fishing line. In general, such a nylon line is weak when subjected to a local point stresses. Therefore, when a nylon line is tied to a fishing article, such as a fishing rod or a fish hook, in a conventional manner, the line is unavoidably subjected during its use to a local stress at the point where the tie is made and tends to be cut at that point, so that the working strength of the line is substantially reduced.

SUMMARY OF THE INVENTION

An object of the present invention is to provide a device for tying fishing line to a fishing article, such as a fishing rod, a fish hook or a sinker, which not only enables the line to avoid local stresses at the portion where the tie locates, but is also adapted to function as a cushioning means for tied line.

Another object of the present invention is to provide a unitary device wherein a tying means may be a part of a fishing article, such as a fishing rod, a hook or a sinker, so that the secure tying of fishing line may be achieved in an extremely simple and speedy way.

DESCRIPTION OF THE PREFERRED EMBODIMENTS

Figure 1:
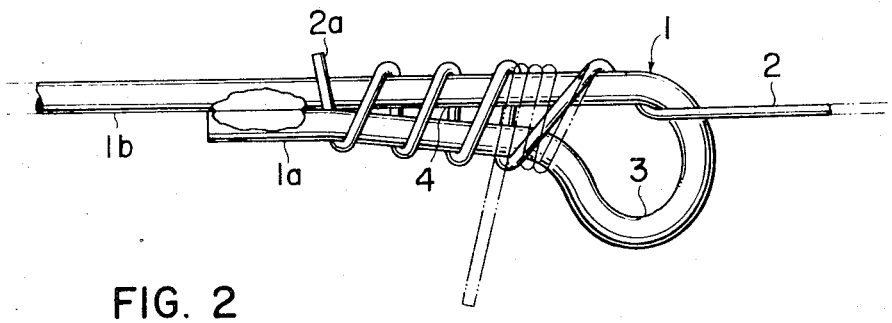
FIG. 1 is an enlarged front view of a preferred embodiment of the present invention, showing a state wherein a fishing line is tied.

In FIG. 1 is shown a device 1 of the present invention made by bending a wire or a rod member of metal or the like. The device 1 comprises a loop 3 through which a fishing line 2 is inserted. Immediately adjacent thereto is formed a V-shaped clip means which holds one end of the fishing line. A bent portion 1a of the rod member is fixedly connected by being welded onto a base or straight shank portion 1b of the same. The device shown in FIG. 2 is substantially the same as that in FIG. 1 but the bent portion 1a of the rod member in this case is fixed to the shank portion 1b by winding this round the shank portion 1b.

FIG. 1 shows the device 1 in a state wherein a fishing line is tied onto the device. The operation as to how the fishing line 2 is tied onto the device 1 is hereinafter explained. The first method is one used when a line 2 to be tied onto the device 1 is a long one or is one whose one end is already tied to another fishing article. In this method, the leading end 2a of the line 2 is first inserted into the loop 3, then this leading end portion of the line is wound a few times around a quill formed by a bent portion 1a and a shank portion 1b of the device 1, the winding of the line being made at the portion of the quill which is close to the loop 3 as shown in dotted lines in FIG. 1, the leading end portion 2a is brought into a securely held position at a V-shaped clip means 4, and finally the wound portion of the line is shifted towards the loop 3 so as to be expanded as shown in solid lines in FIG. 1. The second method is one used when a line 2 to be tied onto the device 1 is a short one or is one which can pass the loop 3 together with a fishing article to which one end of the line is already tied. In this method, the line 2 may be wound onto the device 1 in the following manner. That is, the leading end 2a of the line 2 is first held at the V-shaped clip means, then the line 2 is wound a few times round the quill of the device, and finally the other end of the line is inserted into the loop 3, and thus the tie as shown in FIG. 1 can be achieved.

Figure 2:
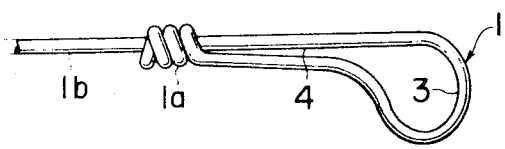
FIG. 2 is a front view of another embodiment of the present invention.

In FIG. 2 is shown an embodiment of the invention in which a loop 3 and a V-shaped clip are formed by bending a rod member in the same way as in FIG. 1, but a bent end portion 1a is fixed to a shank portion by twisting this round the shank portion. The way to tie a line 2 onto this device is same as that explained in connection with the embodiment of FIG. 1.

Figure 3:
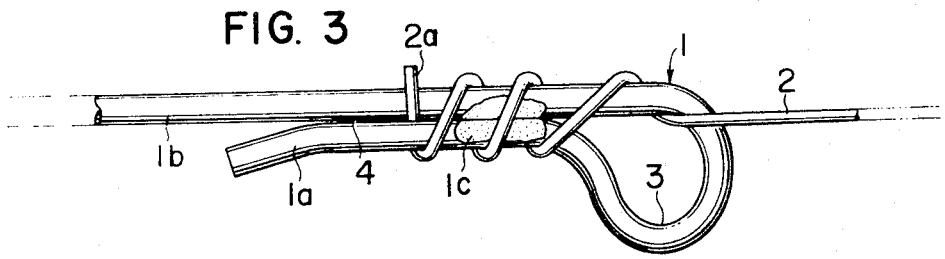
FIG. 3 is a front view of a further embodiment of the present invention showing a state where a fishing line is tied.
Figure 4:
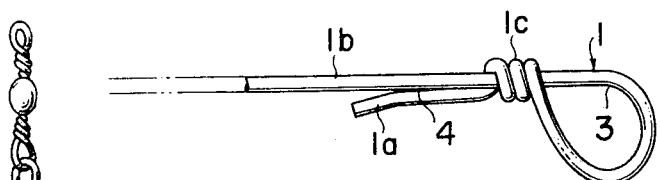
FIG. 4 is a front view of a till further embodiment of the present invention.

FIGS. 3 and 4 show embodiments which are different from those illustrated by FIGS. 1 and 2 in that the relative position of the loop and the V-shaped clip means in the former are different from that of the latter. These embodiments are now explained with the same reference numerals assigned to the same corresponding parts in FIGS. 1 and 2. Again, the loop 3 is formed by a bent rod member, but an intermediate portion 1c of the bent portion of the rod member is either welded to or wound about the base portion 1b. The end portion 1a is bent away from the base portion thereby forming a V-shaped clip means 4 thereat. As will be clear the drawings, these embodiments are different from those shown in FIG. 1 and FIG. 2 in that the space defined by the loop 3 and the V-shaped clip means is continuous and also that the V-shaped clip means 4 open in the direction away from the loop 3. The operation of tying a line 2 to the device 1 is same as that as explained with reference to the embodiment of FIG. 1.

As will be apparent from the detailed explanation given hereinabove, the device 1 renders the operation of tying the line to the device extremely simple and that, as the line is subjected to tensile force the portions of the rod member forming the V-shaped clip means are pressed together in the example of FIGS. 1 and 2 and the end of the line held at the V-shaped clip means pulled into the same in the examples of FIGS. 3 and 4, the end of the line is always securely held in position. Further, it is to be noted that the rod member forming the device has a round or oval shape in cross section, that the area of the line in contact with the device is quite large and that the device is adapted to hold the line in such a way that its movement is unrestricted. Therefore, even when the line is subjected to a sudden pulling force, the device is adapted to function as a cushioning means with the result that the local overstrain which may otherwise occur can be eliminated because the force is distributed over the entire portion of the line wound on the device. Experiments revealed that lines which are tied in a conventional manner are cut almost in all cases at the tied regions and it was found that the working strength of such lines is 60 to 80 percent of their maximum strength. On the other hand, the lines tied by use of the device of the present invention are cut in more than 60 percent of the cases at regions other than the tied portions. It was found that their working strength almost matched their maximum strength.

Figure 5:
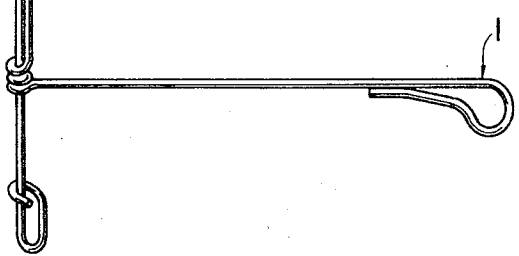
FIG. 5 is a front view of an embodiment of the present invention in which a device as shown in FIG. 1 is formed in an integral form in a branch type device.
Figure 6:
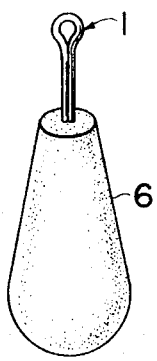
FIG. 6 is a front view of an embodiment in which a device as shown in FIG. 1 is formed in an unitary form in a sinker.
Figure 7:
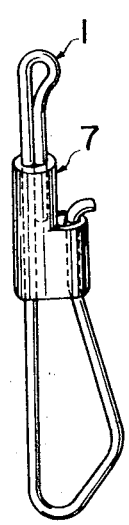
FIG. 7 is a front view of an embodiment in which a device as shown in FIG. 1 is formed in a snap means.
Figure 8:
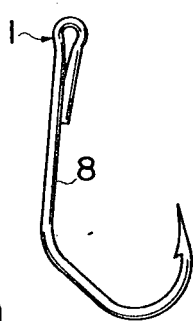
FIG. 8 is a front view of an embodiment in which a device as shown in FIG. 1 is formed integrally in a fish hook.
Figure 9:
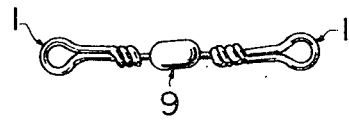
FIG. 9 is a front view of an embodiment in which a device as shown in FIG. 2 is formed in an universal joint means.
Figure 10:
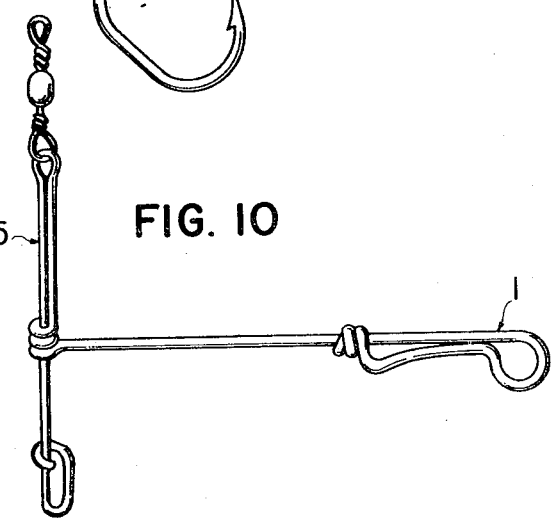
FIG. 10 is a front view of an embodiment in which a device slightly modified from that shown in FIG. 3 is formed in a branch type device.
Figure 11:
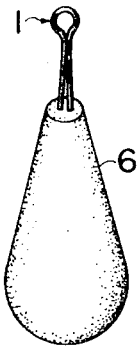
FIG. 11 is a front view of an embodiment in which a device as shown in FIG. 3 is formed in a sinker.
Figure 12:
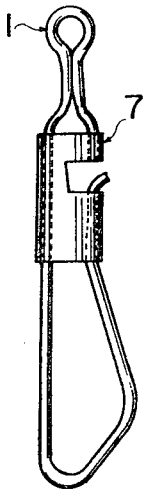
FIG. 12 is a front view of an embodiment in which a device as shown in FIG. 3 is formed in a snap means.
Figure 13:
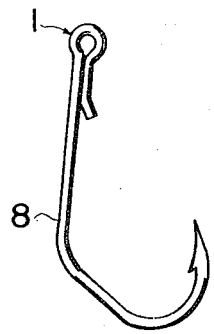
FIG. 13 is a front view of an embodiment in which a device as shown in FIG. 3 is integrally formed in a fish hook.
Figure 14:
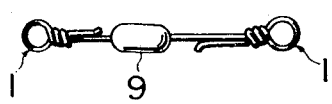
FIG. 14 is a front view of an embodiment in which a device as shown in FIG. 4 is formed in an unitary form in an universal joint means.

FIGS. 4 to 14 represent various embodiments wherein the device of the present invention is unitary formed in various fishing articles. In FIGS. 5 and 10 are shown an example wherein the device 1 as shown in FIG. 1 is integrally formed in a branch type device 5 at the position where the line is to be tied and an example wherein the device 1 as shown in FIG. 3 is likewise formed. FIGS. 6 and 11 show an example wherein the device as shown in each of FIGS. 1 and 3 is built in a sinker 6. FIGS. 7 and 12 show an embodiment wherein the device as shown in each of FIGS. 1 and 3 is unitary formed in a snap 7. FIGS. 8 and 13 show an example wherein the device 1 as illustrated in each of FIGS. 1 and 3 is integrally formed in a hook 8. FIGS. 9 and 14 represent an embodiment wherein the device as shown in each of FIGS. 2 and 4 is attached in a pair to an universal joint means 9. There may be numerous other ways of using the device of the present invention in a variety of unitary forms as examplified in FIGS. 5 through 14.

I claim:
1. A device for securing a flexible line such as a fishing line comprising:
a one-piece rod having:
 a. a first straight shank portion,
 b. a loop having two ends and being in the form of a substantially complete circle with one of said ends being integrally connected to said shank for receiving one end of said line,
 c. a second shank portion having one end integrally connected to the other end of said loop,
 d. said second shank portion having a straight section oriented at an angle relative to said first straight shank portion and making contact with said first portion at the vertex of said angle for forming therebetween a V-shaped hooking means,
 e. said first and second shank portions being securely connected together adjacent said vertex, and
 f. said vertex being located a substantial distance from said loop ends for providing a corresponding length of substantially straight shank formed by the first and second shank portions between said vertex so that said line after it is received through said loop as aforesaid can be wrapped around said shank with its end being disposed in said hooking means whereby the line will be and stay secured to said rod when the line is urged back through said loop.

2. A device as in claim 1, wherein the space defined by said loop and V-shaped hooking means is continuous.

3. A device as in claim 1, wherein the connection between said first and second shank portions is by a weld.

4. A device as in claim 1, wherein said first and second shank portions are connected together as aforesaid by the second shank portion being wrapped around the first shank portion.

5. A device as in claim 1, wherein said V-shaped hooking means and loop are on opposite sides of the connection between said first and second shank portions.

* * * * *